March 17, 1936.   L. RICEFIELD   2,034,002
COUPLING
Original Filed April 11, 1930
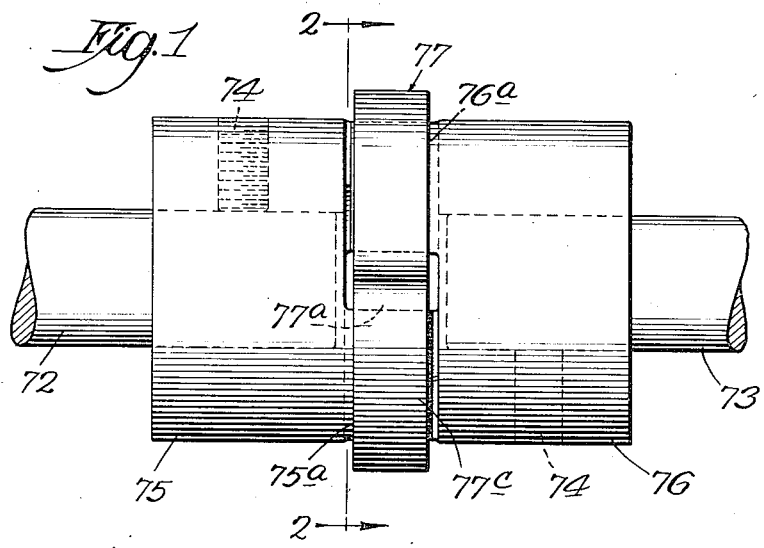
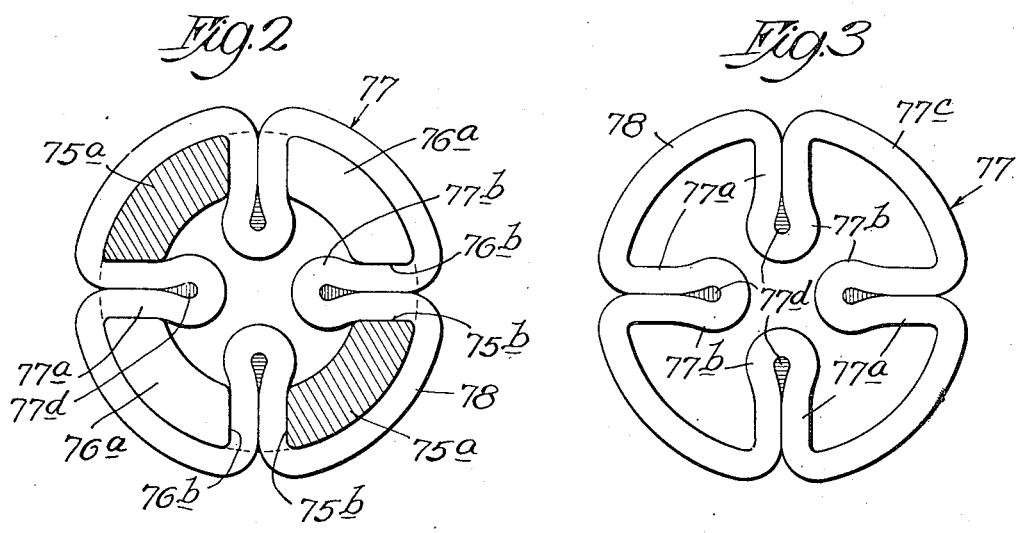
Inventor:
Louis Ricefield.
By Davis, Macauley, May, Lindsey & Smith
Attys.

Patented Mar. 17, 1936

2,034,002

UNITED STATES PATENT OFFICE 2,034,002

COUPLING

Louis Ricefield, Oak Park, Ill.

Original application April 11, 1930, Serial No. 443,349. Divided and this application July 17, 1935, Serial No. 31,777

4 Claims. (Cl. 64—14)

This invention relates to improvements in couplings and its purpose is to provide an improved device for connecting two substantially aligned shafts in order to compensate for relative lateral and angular misalignment of the shafts and to permit relative endwise movement thereof during their rotation. The present application is a division of my co-pending application Serial No. 443,349, filed April 11, 1930. The present invention relates to that type of coupling in which a pair of metallic coupling members are secured on the two substantially aligned shafts and are provided with longitudinally extending lugs or jaws which intermesh loosely with each other and which are adapted to transmit power from one coupling member to the other through an intermediate power transmitting member, which, as disclosed in said application, may take the form of a spider having a central hub and radiating arms each of which extends between two lugs or jaws carried by opposite coupling members. The principal object of the present invention is to provide a coupling of the type referred to in which the power transmitting member takes the form of a body surrounding the lugs or jaws of the coupling members and having inwardly extending arms extending between and coacting with these lugs or jaws so that power is transmitted through these arms from one coupling member to the other. A further object of the invention is to provide a power transmitting member for a coupling of this type comprising a non-metallic member extending around the intermeshing parts of the coupling members and having inwardly extending arms which are formed by doubling inwardly portions of the body of the member. Other objects relate to various features of construction and arrangement which will appear more fully hereinafter.

The nature of the invention will be understood from the following specification taken with the accompanying drawing, in which one embodiment is illustrated.

In the drawing,

Fig. 1 shows a side elevation of an improved coupling embodying the features of the present invention;

Fig. 2 shows a transverse section taken on the line 2—2 of Fig. 1; and

Fig. 3 shows an end elevation of the power transmitting member.

In the drawing, a pair of substantially aligned shafts 72 and 73 are shown as having secured upon them by means of a set screw 74 and keys or the like, a pair of coupling members 75 and 76, respectively, which are provided with longitudinally extending lugs or jaws 75$^a$ and 76$^a$, respectively, adapted to intermesh loosely with each other. These lugs or jaws 75$^a$ and 76$^a$ have inwardly extending edge surfaces 75$^b$ and 76$^b$ which are so arranged that these surfaces on adjacent lugs extend parallel to each other and parallel to a plane passing through the axis of the coupling member. The lugs or jaws are located on the outer portions of the coupling members and the inner margins of the surfaces 75$^b$ and 76$^b$ are located some distance outwardly from the axis of the coupling. These surfaces on each pair of adjacent lugs are adapted to receive between them one of the arms 77$^a$ formed on the power transmitting member 77. In this form, the arms 77$^a$ are formed by doubling inwardly portions of an endless member 78 which extends around the outer surfaces of the lugs or jaws 75$^a$ and 76$^a$. The inwardly extending arms 77$^a$ terminate in enlarged rounded or bowed portions 77$^b$ which are located inwardly of the inner margins of the lugs or jaws on the coupling members so that, due to their enlargement, they prevent outward movement of the power transmitting member under the influence of centrifugal force. The doubled portions which constitute each arm 77$^a$ may be secured together by cement, staples or the like and the apertures between the bowed portions may be filled with suitable material 77$^d$, such as rubber or the like. The arms 77$^a$ are connected to each other by the curved portions 77$^c$, each of which extends over the outer peripheral surface of one of the lugs or jaws 75$^a$ or 76$^a$. These lugs or jaws thus hold the power transmitting member against inward movement and at the same time retain the arms 77$^a$ in their proper relationship to each other. The member 78 from which the power transmitting member is formed may be an endless belt made of leather or of fabric and rubber or of other material adapted for the purpose.

Although one form of the invention has been shown or described, it will be understood that it may be constructed in various other embodiments coming within the scope of the appended claims.

I claim:

1. The combination in a coupling for connecting substantially aligned shafts, of a pair of coupling members each having a plurality of longitudinally extending lugs adapted to mesh loosely with the lugs of the other coupling member, and a power transmitting member formed of flexible material having parts thereof extending circumferentially on the outer sides of said lugs and having doubled contacting portions thereof extending inwardly to be compressed between adjacent lugs carried by opposite coupling members.

2. The combination in a coupling for connecting substantially aligned shafts, of a pair of coupling members each having a plurality of longitudinally extending lugs adapted to mesh loosely with the lugs of the other coupling member, said lugs on opposite coupling members being at the same radial distance from the axis of rotation, and a power transmitting member surrounding said lugs and having inwardly extending arms, each arm extending between and contacting with two of said lugs carried by opposite coupling members to be compressed when forces are transmitted from one coupling member to the other.

3. The combination in a coupling for connecting substantially aligned shafts, of a pair of coupling members each having a plurality of longitudinally extending lugs adapted to mesh loosely with the lugs of the other coupling member, and a power transmitting member surrounding said lugs and having inwardly extending power transmitting arms each contacting with two of said lugs carried by opposite coupling members, each of said arms having an enlarged inner end of greater thickness than the distance between the jaws engaging that arm to prevent outward movement of said arm.

4. The combination in a coupling for connecting substantially aligned shafts, of a pair of coupling members each having a plurality of longitudinally extending lugs adapted to mesh loosely with the lugs of the other coupling member, and a power transmitting member comprising parts extending on the outer sides of said lugs and other parts of resilient material extending inwardly between and contacting with said lugs, the lugs on opposite coupling members being positioned opposite each other to compress said inwardly extending parts between them.

LOUIS RICEFIELD.